Oct. 17, 1950   M. T. WORKS ET AL   2,525,989
VALVE
Filed Jan. 15, 1945   2 Sheets-Sheet 2
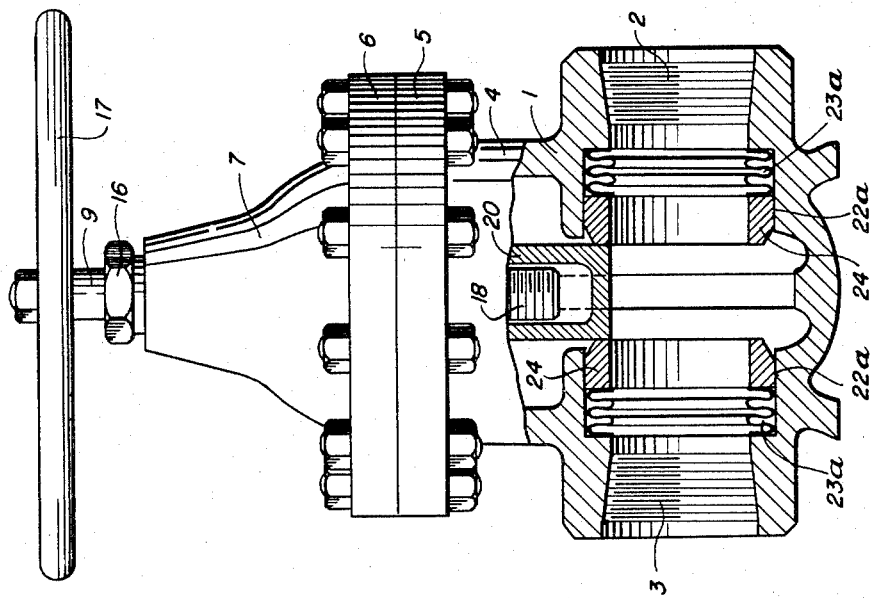
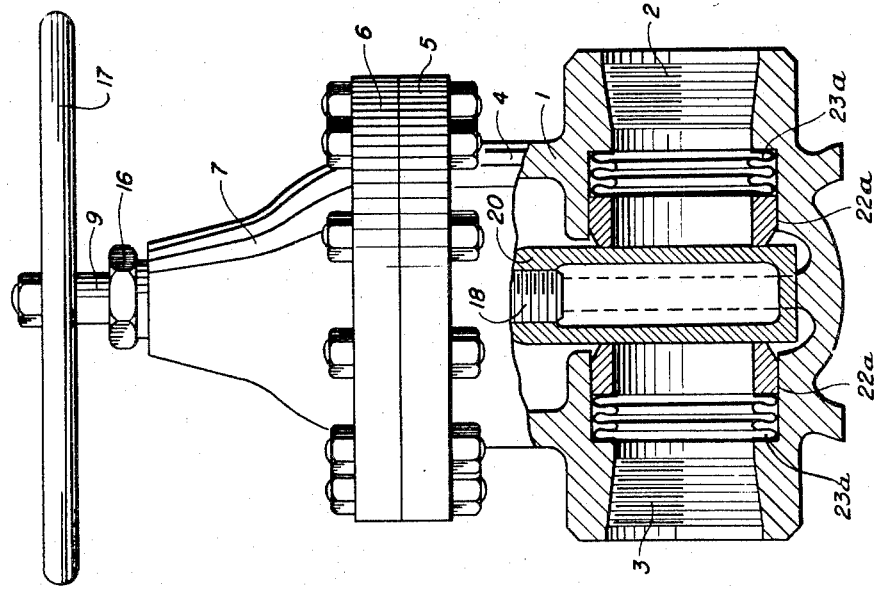
MARVIN R. JONES
MADDEN T. WORKS INVENTORS Patented Oct. 17, 1950

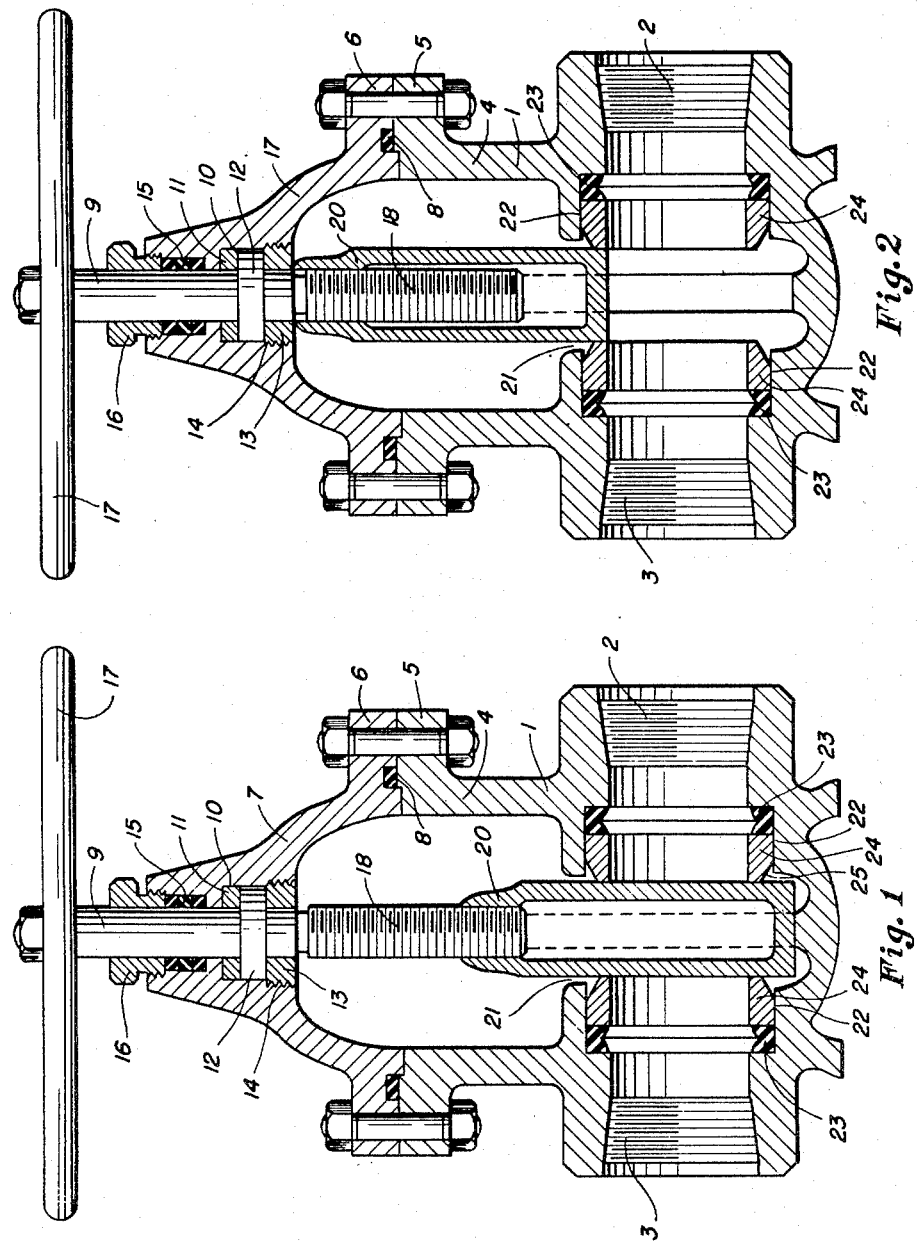

2,525,989

UNITED STATES PATENT OFFICE 2,525,989

VALVE

Madden T. Works and Marvin R. Jones, Houston, Tex., assignors to Cameron Iron Works, Houston, Tex., a corporation of Texas Application January 15, 1945, Serial No. 572,803

1 Claim. (Cl. 251—167)

This invention relates to valves and has for its general object the provision of a more perfect and durable seal for a valve closure member when the same is in closed position.

Many attempts have been made in the past to provide a durable and effective sealing means for a valve closure to form a seal against such closure when the closure is in closed position, but in the past these have for the most part taken the form of some flexible sealing material adapted to engage the closure member and seal against it. However, the closure member was forced to slide over such soft or resilient sealing means in moving to and from its closed position, and in such sliding movement had a tendency to tear or otherwise destroy the sealing member.

Others have endeavored to provide a solution for this problem by making a rather complicated closure structure of such a nature that the closure might be expanded against a fixed and relatively hard or solid sealing member or seat, after the closure had been moved to closed position. Such an arrangement, however, necessitates the employment of a rather complicated closure structure involving several parts, and usually depends upon the judgment of the operator to determine to what extent the closure elements will be expanded with respect to each other and hence with what force the closure member will be forced against the relatively solid sealing members. Inasmuch as the necessary force to be exerted for this purpose carries with the pressure of the fluid being handled, such a valve is not only expensive and subject to the disorders of structures with a large number of parts, but is also subject to being damaged by improper handling.

It is, therefore, a specific object of this invention to provide a valve structure in which there will be formed between the body and the closure a seal which will not be dependent upon a number of component parts in the closure member and which will not be soft and resilient and hence subject to being torn or destroyed by the movement of the closure member to and from closed position.

Another object of this invention is to provide a structure in which a sealing will be effected between the valve body and valve closure which sealing will be in proportion to the pressure of the fluid being sealed against.

Another object of this invention is to provide a simple and economical structure which will be positive in its action and will not depend upon any wedging action for the application of the necessary sealing pressure to the seating surfaces, but will have a sealing pressure exerted that will always be in exact proportion to the pressure being sealed against.

Other objects and advantages of this invention will become apparent from the following description taken in connection with the accompanying drawing wherein are illustrated by way of example two embodiments of the invention.

In the drawing:

Fig. 1 shows a vertical cross section through a gate valve constructed in accordance with this invention, the valve being illustrated in closed position.

Fig. 2 illustrates the valve shown in Fig. 1 but with the parts shown in open position.

Fig. 3 is a view similar to Fig. 1 but showing a modified form of sealing arrangement.

Fig. 4 is a view similar to Fig. 2 but illustrating the valve shown in Fig. 3.

In all of the figures, the numeral 1 designates a valve body having a flow passage therethrough with terminal openings 2 and 3 at opposite sides of the valve body.

At one side of the flow passage the valve body is extended as shown at 4 to form a chamber terminating in a flange 5 adapted to receive the flange 6 of a bonnet 7 which closes the lateral extension 4. The flanges 5 and 6 are preferably sealed to each other by any suitable sealing means such as a ring 8 between them, and are held together by suitable bolts or studs.

The operating stem 9 of the valve extends through a central opening in the bonnet 7, and in this opening there is formed a counterbore 10 extending from the interior of the bonnet and adapted to receive a thrust washer 11. This thrust washer 11 is adapted to receive and take the thrust from the flange 12 on the stem 9, and the flange 12 is secured in place against the thrust washer 11 by means of a thrust nut 13 threaded into the inner end of the counterbore as illustrated at 14. Outwardly of the counterbore, the opening through the bonnet 7 is provided with a second counterbore extending from the outer end of the bonnet and having deposited therein suitable sealing rings 15 held in place by a gland nut 16 threaded into the outer end of such counterbore.

An operating handwheel 17 is carried on the outer end of the stem 9 and the inner end of this stem is threaded as at 18 to engage the threaded portion of the gate or closure member 20.

It will be observed that this closure member 20 may advance into and across the flow passage in the valve body by entering through an opening 21 from the chamber within the extension 4 and the bonnet 7 and may be moved across such passageway until it completely obstructs the passageway as illustrated in Fig. 1.

Referring now particularly to the form illustrated in Figs. 1 and 2, there is formed in the flow passageway on either side of the closure 20 a counterbore 22, each of these counterbores being adapted to receive therein a soft resilient lip-type sealing ring 23 and a relatively hard and rigid seating ring 24, this seating ring being beveled on its forward and outer surface, that is on the outer corner of that end of the ring which engages the closure 20, as indicated at 25.

In operation, the valve illustrated in Figs. 1 and 2 is very similar to the usual type of gate valve. However, it will be noted that the closure 20 is not of wedge-shaped formation nor is it made up of a plurality of different parts, but is a single gate member or closure member with parallel flat sides.

At such times as the valve may be open as illustrated in Fig. 2, the seating rings 24 will not be pressed endwise against the closure 20 with any substantial force, because the pressure of the fluid passing through the conduit will act equally upon the two opposite ends of the seating rings 24 and the rings 23 are so proportioned that they will not exert any substantial pressure against the rear ends of the seating rings 24 urging them toward the gate 20.

However, when the closure member 20 is moved to the closed position as illustrated in Fig. 1, the pressure within the flow passage through the body 1 on that side of the closure which is upstream will act upon the inner periphery of the ring 23 causing the lips thereof to seal respectively against the shoulder formed by the inner end of the counterbore 22 and against the rear end of the seating ring 24. The sealing rings 23 being of rubber or other similar semifluid resilient material, pressure exerted upon them will tend to cause them to flow, and the same pressure in substance will be exerted over the entire rear face of the seating ring 24 urging this ring toward the closure or gate 20 with a force depending entirely upon the pressure being sealed against.

It will be appreciated that any pressure fluid trapped within the valve chamber in the extension 4 in the bonnet 7 may be relieved by its action upon the beveled portion of the seating ring 24 on the downstream side of the closure. Such pressure will tend to cause the seating ring 24 to move away from the closure thus relieving any such excess pressure on the downstream side of the valve. At the same time, on the upstream side of the valve the pressure being sealed against will as above stated act upon substantially the entire end area of the seating ring 24 and urge it with a corresponding force against the closure. Due to the fact that the closure is beveled as at 25, the area of the seating ring 24 which is in contact with the closure will be less than that acted upon by the pressure being sealed against, and hence the unit pressure between the seating ring 24 and the closure 20 will be greater than that of the pressure being sealed against.

It will further be seen that inasmuch as the closing and seating elements 20 and 24 are both of relatively hard material, there will be little tendency to cause the destruction of either when the closure 20 is slid across the seating member 24 as in opening the valve.

Thus there has been provided a valve in which not only is the sealing pressure proportional to the pressure being sealed against, but in which the number of moving parts is relatively low, the parts are made of such construction that opening and closing movement of the valve will not tend to destroy them, and in which the structure is so simple that it can be easily and cheaply manufactured.

The valve illustrated in Figs. 3 and 4 is much the same as that illustrated in Figs. 1 and 2, the counterbores 22a being substantially the same as the counterbores 22 except that they are adapted to receive bellows-type sealing members 23a instead of the lip-type resilient sealing rings 23. These bellows-type sealing rings or members may be soldered or otherwise secured to the shoulder at the rear end of the counterbore 22a and to the rear end of the seating ring 24, or any suitable means may be provided for forming a seal between this member 23a and the shoulder and seating ring referred to.

The action of the valve illustrated in Figs. 3 and 4 is in substance the same as that shown in Figs. 1 and 2, the only real difference being that in the valve shown in Figs. 3 and 4 use is made of the bellows-type sealing means rather than the lip-type sealing means shown in Figs. 1 and 2.

From the foregoing it will be apparent that means has been provided for carrying out and accomplishing all of the objects and advantages sought by this invention.

Having described our invention, we claim:

In a valve a body member with a fluid passage therethrough made up of separated tubular inlet and outlet ports, a closure member operably mounted within the body to be selectively moved into open and closed positions in the space between the ports, counterbore portions in both ports adjacent the closure member, a rigid seal ring slidably mounted within each of the counterbore portions and each adapted to have one end sealingly engage the closure member when in closed position, the length of the rings being less than the distance from the ends of their respective receiving counterbores to the closure member, flowable, resilient sealing material substantially filling the annular spaces provided between the outer ends of the seal rings and the ends of the counterbores in which they are mounted, the flowable material in each instance having an inner periphery exposed to the interior of the valve passageway and their other surfaces solidly backed up by rigid supporting material of the port walls and seal rings to prevent rupture of the flowable material and urge the seal rings against the closure member, and an external beveled edge upon each of the rigid seal rings adjacent the closure and exposed to pressure within the valve body whereby excess pressures within the body are automatically relieved with the valve closed.

MADDEN T. WORKS.
MARVIN R. JONES.

REFERENCES CITED

The following references are of record in the file of this patent:

UNITED STATES PATENTS

| Number | Name | Date |
|---|---|---|
| 1,489,857 | Stevens | Apr. 8, 1924 |
| 2,030,458 | McKellar | Feb. 11, 1936 |
| 2,063,655 | Barner | Dec. 8, 1936 |

FOREIGN PATENTS

| Number | Country | Date |
|---|---|---|
| 629,628 | Germany | May 11, 1936 |
| 802,047 | France | May 30, 1936 |
| 805,137 | France | Aug. 17, 1936 |